(12) United States Patent
Sumi et al.

(10) Patent No.: US 6,717,629 B2
(45) Date of Patent: Apr. 6, 2004

(54) LIQUID CRYSTAL DISPLAY DEVICE WITH CONDUCTIVE CHAMFERING AMOUNT MARKS AND METHOD OF MANUFACTURING THE SAME

(75) Inventors: Akinori Sumi, Kumamoto (JP); Ichiro Takasaki, Kumamoto (JP); Miyuki Hirosue, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 10/283,206

(22) Filed: Oct. 30, 2002

(65) Prior Publication Data

US 2003/0063250 A1 Apr. 3, 2003

Related U.S. Application Data

(62) Division of application No. 09/729,673, filed on Dec. 5, 2000, now Pat. No. 6,480,256.

(30) Foreign Application Priority Data

Dec. 10, 1999 (JP) .............................. 11-351777

(51) Int. Cl.⁷ ............................................ G02F 1/1333
(52) U.S. Cl. ....................................................... 349/40
(58) Field of Search ............................................ 349/40

(56) References Cited

U.S. PATENT DOCUMENTS

| 5,652,632 A | * | 7/1997 | Shimizu ....................... 349/40 |
| 6,411,351 B1 | * | 6/2002 | Zhang et al. .................. 349/54 |
| 2002/0021375 A1 | * | 2/2002 | Nakajima et al. ............. 349/40 |

FOREIGN PATENT DOCUMENTS

JP         8-278514         10/1996

\* cited by examiner

*Primary Examiner*—Robert H. Kim
*Assistant Examiner*—Timothy Rude
(74) *Attorney, Agent, or Firm*—McDermott, Will & Emery

(57) ABSTRACT

In a process for chamfering substrates constituting a liquid crystal display device, it is made possible to prevent a static electricity from generating in a chamfering amount mark used in order to perform a highly accurate chamfering, and improve a chamfering accuracy. There is provided a structure in which a chamfering amount mark 7 formed in an end portion of a 1st substrate is formed so as to be electrically connected to a short wiring 10, and a connection between the chamfering amount mark 7 and extension wirings 9 which are another conductive wirings is performed, thereby discharging the static electricity to another conductive pattern. Incidentally, there is adopted a structure in which plural mark patterns 8b constituting the chamfering amount mark 7 are intended to be electrically connected by a connecting wiring 8a and, additionally, the connecting wiring 8a is extended to a short wiring 10 side.

42 Claims, 6 Drawing Sheets

PRIOR ART

LIQUID CRYSTAL DISPLAY DEVICE WITH CONDUCTIVE CHAMFERING AMOUNT MARKS AND METHOD OF MANUFACTURING THE SAME

This application is a divisional of application Ser. No. 09/729,673 filed Dec. 5, 2000 now U.S. Pat. No. 6,480,256.

BACKGROUND OF THE INVENTION

1. Field of the Invention

The present invention relates to a liquid crystal display device for performing an image display by interposing a liquid crystal between two substrates and a method of manufacturing the same.

2. Description of the Related Art

In FIG. 9A, there is shown a plan view of an active matrix type TFT liquid crystal display device utilizing thin film transistors (TFTs) as switching elements and, in FIG. 9B, a plan view of a main portion centering around a chamfering area A2 in an end portion of substrate constituting the liquid crystal display device. In this liquid crystal display device, a liquid crystal material is interposed between a 1st substrate 101 and a 2nd substrate 102, plural signal wirings 103 and plural scan wirings 104 are formed on the 1st substrate 101, TFTs and pixel electrodes are connected to positions where the signal wirings 103 intersect the scan wirings 104, and an image is displayed by means of controlling an orientation of the liquid crystal material by driving the TFTs. A1 shows a display area.

The 1st substrate 101 is produced with its dimension being made somewhat larger than the 2nd substrate 102, a connecting terminal portion (general term for signal wiring connecting terminals 105 and scan wiring connecting terminals 106) is formed in the signal wirings 103 and the scan wirings 104, which are extended outside the 2nd substrate, and it is connected to an external driving circuit at this connecting terminal portion. In addition, the reference numeral 107 denotes chamfering amount marks formed as marks showing chamfering upper and lower limits when a chamfering work is performed to an end portion at a side, of the 1st substrate 101, where the connecting terminal portion is formed, 109 an extension wiring extended from the signal wiring 103 or the scan wiring 104, and 110 a short wiring which is formed in the end portion of the 1st substrate 101 to be chamfered and is electrically connected to the plural extension wirings 109.

In a cell assembling process for superposing the 1st substrate 101 and the 2nd substrate 102 facing the former and injecting the liquid crystal, in order to orient the liquid crystal material, there is required such a process as rubbing polyimide films (orientation films) applied to the 1st substrate 101 and the 2nd substrate 102 with a cloth, but in this process there is a case that a very strong static electricity is generated, and thus an overvoltage is applied to the scan wirings 104 and the signal wirings 103, so that a line defect is generated by a deterioration of the TFT on the wirings, and the like. As a countermeasure for preventing such a line defect, there has been known a method in which the short wiring 110 for short-circuiting the signal wirings 103 and the scan wirings 104 is disposed in the vicinity of the substrate end portion and, before a lighting inspection process, the short wiring 110 is excised by a chamfering work of an end face.

However, there is a case that the short wiring 110 generates an elimination badness owing to a dispersion in chamfering amount and the like and, in this case, a short circuit between the adjoining wirings occurs, so that there has been a problem that a display badness such as the line defect and a breakage of an inspection driving circuit occur. Further, reversely, in case where the chamfering amount is set large in order to prevent the elimination badness, there have been problems that it takes a time to perform the chamfering work, so that a cost is increased and, besides, a terminal connecting portion and the like are resected.

Further, on the other hand, since the liquid crystal display device is used in a note type personal computer, a portable terminal and the like, it is strongly demanded to lighten them and narrow their frames. As one means for meeting these demands, there is a method of economizing a chamfering region by reducing the chamfering amount in a panel end. In this case, it is required to improve a chamfering accuracy than former times and, in order to realize an improvement in the chamfering accuracy without incurring a cost, there must be established a method of accurately process-controlling the chamfering amount in a usual manufacturing process.

In order to solve such problems of the elimination badness prevention and the chamfering amount reduction as mentioned above, as disclosed in Japanese Patent Laid-Open No. 278514/1996 Gazette, there has been known a method in which marks showing a chamfered state are formed. As shown in FIG. 9B, it is shown that, in this method, patterns of the chamfering amount marks 107 showing the chamfered state are disposed/formed on a position which is a lower limit position of the chamfering amount and shows a necessary minimum limit region, including the short wiring 110, to be chamfered and a position which is an upper limit position of the chamfering amount and shows a region not to be chamfered, and it is possible to easily prevent the elimination badness of the short wiring 110 and an excessive chamfering amount by means of performing a work while confirming, by visual observation, the mark portions in the chamfering process. Further, it is mentioned about the fact that, by means of controlling the chamfering amount by using the chamfering amount marks 107, a dispersion of the chamfering amount can be easily and accurately grasped, so that the chamfering accuracy can be improved without a new equipment investment.

However, generally, when forming the chamfering amount marks 107, in order to avoid adding a new process for forming the chamfering amount marks 107, a conductive thin film such as mainly Cr and Al is used because a thin film layer existing on the 1st substrate 101 is concurrently used. Accordingly, in case where the chamfering amount marks 107 are formed independently of another conductive pattern, a pattern of the chamfering amount marks 107 is electrified by a static electricity generated in a manufacturing process such as cell assembling process, so that there have been such risks that an electric discharge occurs in a later process and thus the chamfering amount marks 107 and patterns of insulation film and conductive film in the vicinity thereof are damaged and, additionally, that a display badness such as the line defect occurs by the fact the scan wirings 104 and the signal wirings 103, which exist near to the chamfering amount marks 107, are damaged.

In case of avoiding such electric discharge troubles as mentioned above, although there is considered a countermeasure that the pattern of the chamfering amount marks 107 is made an insulation film, since it is necessary to use an opaque material in order to possess a function as the marks, an insulation material such as silicon nitride used on the 1st substrate 101 cannot be concurrently used, so that a new process for forming the chamfering amount marks 107 becomes necessary, thereby leading to an increase in cost.

SUMMARY OF THE INVENTION

The invention has been achieved in order to solve such problems of the prior art as mentioned above, and its object is to provide a display device capable of reducing its cost, lightening its weight and narrowing its frame by preventing a reduction in process yield owing to the display badness resulting from the static electricity generated in a conductive pattern becoming the chamfering amount marks and by reducing the chamfering amount.

The invention provides a liquid crystal display device in which a liquid crystal is interposed between a 1st substrate and a 2nd substrate, wherein a conductive chamfering amount mark provided on the 1st substrate and used as a mark when chamfering the 1st substrate is constituted by a mark pattern disposed in a reference position consisting of at least any of a center, an upper limit and a lower limit of chamfering on the 1st substrate and a connecting wiring connected to the mark pattern, and the chamfering amount mark is left contacting with a chamfered end portion of the 1st substrate.

Further, the invention provides a liquid crystal display device in which a liquid crystal is interposed between a 1st substrate and a 2nd substrate, wherein a conductive chamfering amount mark provided on the 1st substrate and used as a mark when chamfering the 1st substrate is constituted by a mark pattern disposed in a reference position consisting of at least any of a center, an upper limit and a lower limit of chamfering on the 1st substrate and a connecting wiring for connecting the mark pattern to a conductive wiring formed on the 1st substrate.

Additionally, the invention provides a liquid crystal display device wherein, in such a constitution as mentioned above, the conductive wiring and the chamfering amount mark are formed in one continuous pattern.

Further, the invention provides a liquid crystal display device wherein, in such a constitution as mentioned above, the mark pattern and the connecting wiring are disposed through a transparent insulating film and electrically connected in a contact hole opened in the transparent insulating film.

Additionally, the invention provides a liquid crystal display device in which a liquid crystal is interposed between a 1st substrate and a 2nd substrate, wherein a chamfering amount mark provided on the 1st substrate and used as a mark when chamfering the 1st substrate is constituted by a conductive pattern having a mark pattern disposed in a reference position consisting of at least any of a center, an upper limit and a lower limit of chamfering on the 1st substrate, and a conductive wiring formed on the 1st substrate and the conductive pattern are electrically connected at a mutually superposed position.

Further, the invention provides a liquid crystal display device wherein, in such a constitution as mentioned above, the mark pattern is constituted by a different conductive pattern or a punched pattern.

Additionally, the invention provides a liquid crystal display device in which a liquid crystal is interposed between a 1st substrate and a 2nd substrate, wherein a chamfering amount mark used as a mark when chamfering the 1st substrate is constituted by end portions of conductive wirings formed on the 1st substrate, and an electrically connectable mark pattern connecting, in a ladder-like form, between the plural adjoining conductive wirings is disposed in a reference position consisting of at least any of a center, an upper limit and a lower limit of chamfering.

Further, the invention provides a liquid crystal display device in which a liquid crystal is interposed between a 1st substrate and a 2nd substrate, wherein a chamfering amount mark provided on the 1st substrate and used as a mark when chamfering the 1st substrate is constituted by an end portion of a conductive wiring formed on the 1st substrate, and a mark pattern connecting, in a ladder-like form, between branch wirings of the conductive wiring whose tip has been branched is disposed in a reference position consisting of at least any of a center, an upper limit and a lower limit of chamfering.

Additionally, the invention provides a liquid crystal display device in which a liquid crystal is interposed between a 1st substrate and a 2nd substrate, wherein a chamfering amount mark provided on the 1st substrate and used as a mark when chamfering the 1st substrate is constituted by bending an end portion of a conductive wiring formed on the 1st substrate, and a mark pattern consisting of a bent portion in which the conductive wiring has been bent is disposed in a reference position consisting of at least any of a center, an upper limit and a lower limit of chamfering.

Further, the invention provides a liquid crystal display device in which a liquid crystal is interposed between a 1st substrate and a 2nd substrate, wherein a chamfering amount mark provided on the 1st substrate and used as a mark when chamfering the 1st substrate is constituted by changing, at a predetermined interval, a wiring width of an end portion of a conductive wiring formed on the 1st substrate, and a mark pattern consisting of a wiring width changed portion in which a width of the conductive wiring has been changed is disposed in a reference position consisting of at least any of a center, an upper limit and a lower limit of chamfering.

Additionally, the invention provides a method of manufacturing a liquid crystal display device, comprising a process for forming conductive wirings on a 1st substrate, forming a short wiring for mutually electrically connecting the plural conductive wirings in the vicinity of an end portion of the 1st substrate, and further forming a chamfering amount mark constituted by mark patterns electrically connected to the short wiring or the conductive wirings and disposed in a reference position consisting of at least any of a center, an upper limit and a lower limit of chamfering on the 1st substrate, and by a connecting wiring for mutually electrically connecting the plural mark patterns, a process for bonding the 1st substrate after an orientation treatment and a 2nd substrate and injecting a liquid crystal, and a process for performing the chamfering with the chamfering amount mark provided on the 1st substrate being made a reference, thereby excising the short wiring.

Further, the invention provided a method of manufacturing a liquid crystal display device, comprising a process for forming conductive wirings on a 1st substrate, forming a short wiring for mutually electrically connecting the plural conductive wirings in the vicinity of an end portion of the 1st substrate, and further forming a chamfering amount mark constituted by mark patterns electrically connected to the conductive wirings and disposed in a reference position consisting of at least any of a center, an upper limit and a lower limit of chamfering on the 1st substrate, and by a connecting wiring for mutually electrically connecting the mark patterns to the conductive wirings, a process for bonding the 1st substrate after an orientation treatment and a 2nd substrate and injecting a liquid crystal, and a process for performing the chamfering with the chamfering amount mark provided on the 1st substrate being made a reference, thereby excising the short wiring.

Additionally, the invention provided a method of manufacturing a liquid crystal display device, comprising a process for forming conductive wirings on a 1st substrate and forming a short wiring for mutually electrically connecting the plural conductive wirings in the vicinity of an end portion of the 1st substrate, a process for forming a chamfering amount mark constituted by mark patterns electrically connected to the short wiring on the 1st substrate and disposed in a reference position consisting of at least any of a center, an upper limit and a lower limit of chamfering on the 1st substrate, and by a connecting wiring superposed with the mark patterns through a transparent insulating film, performing an electric connection to the mark patterns in a contact hole opened in the transparent insulating film, and mutually electrically connecting the plural mark patterns or electrically connecting the mark patterns to the conductive wirings, a process for bonding the 1st substrate after an orientation treatment and a 2nd substrate and injecting a liquid crystal, and a process for performing the chamfering with the chamfering amount mark provided on the 1st substrate being made a reference, thereby excising the short wiring.

Further, the invention provided a method of manufacturing a liquid crystal display device, comprising a process for forming conductive wirings on a 1st substrate and forming a short wiring for mutually electrically connecting the plural conductive wirings in the vicinity of an end portion of the 1st substrate, a process for forming a transparent insulating film on the 1st substrate including surfaces of the conductive wirings, a process for forming a contact hole in the transparent insulating film positioned on the conductive wirings, a process for forming a chamfering amount mark constituted by conductive patterns including, on the transparent insulating film, mark patterns disposed in a reference position consisting of at least any of a center, an upper limit and a lower limit of chamfering on the 1st substrate, and performing an electric connection between the conductive wirings and the chamfering amount mark in the contact hole, a process for bonding the 1st substrate after an orientation treatment and a 2nd substrate and injecting a liquid crystal, and a process for performing the chamfering with the chamfering amount mark provided on the 1st substrate being made a reference, thereby excising the short wiring.

Additionally, the invention provided a method of manufacturing a liquid crystal display device, comprising a process for forming a chamfering amount mark constituted by conductive patterns including, in the vicinity of an end portion to be chamfered of a 1st substrate, mark patterns disposed in a reference position consisting of at least any of a center, an upper limit and a lower limit of chamfering on the 1st substrate, a process for forming a transparent insulating film on the 1st substrate including a surface of the chamfering amount mark, a process for opening a contact hole in the transparent insulating film positioned on the chamfering amount mark, a process for forming conductive wirings on the transparent insulating film and, at the same time, forming a short wiring for mutually electrically connecting the plural conductive wirings in the vicinity of the end portion of the 1st substrate, and performing an electric connection between the conductive wirings and the chamfering amount mark in the contact hole, a process for bonding the 1st substrate after an orientation treatment and a 2nd substrate and injecting a liquid crystal, and a process for performing the chamfering with the chamfering amount mark provided on the 1st substrate being made a reference, thereby excising the short wiring.

Further, the invention provided a method of manufacturing a liquid crystal display device, wherein, in such a constitution as mentioned above, the mark pattern is formed by a different conductive pattern or a punched pattern.

Additionally, the invention provides a method of manufacturing a liquid crystal display device, comprising a process for forming conductive wirings on a 1st substrate, and forming a chamfering amount mark which is constituted by end portions of the conductive wirings and in which an electrically connectable mark pattern connecting, in a ladder-like form, between the plural adjoining conductive wirings is disposed in a reference position consisting of at least any of a center, an upper limit and a lower limit of chamfering, a process for bonding the 1st substrate after an orientation treatment and a 2nd substrate and injecting a liquid crystal, and a process for performing the chamfering with the chamfering amount mark provided on the 1st substrate being made a reference.

Further, the invention provides a method of manufacturing a liquid crystal display device, comprising a process for forming conductive wirings on a 1st substrate, and forming a chamfering amount mark which is constituted by end portions of the conductive wirings and in which a mark pattern connecting, in a ladder-like form, between branch wirings of the conductive wiring whose tip has been branched is disposed in a reference position consisting of at least any of a center, an upper limit and a lower limit of chamfering, a process for bonding the 1st substrate after an orientation treatment and a 2nd substrate and injecting a liquid crystal, and a process for performing the chamfering with the chamfering amount mark provided on the 1st substrate being made a reference.

Additionally, the invention provides a method of manufacturing a liquid crystal display device, comprising a process for forming conductive wirings on a 1st substrate, and forming a chamfering amount mark which is constituted by end portions of the conductive wirings and in which a bent portion is provided in a reference position constituted by bending an end portion of the conductive wiring and consisting of at least any of a center, an upper limit and a lower limit of chamfering, a process for bonding the 1st substrate after an orientation treatment and a 2nd substrate and injecting a liquid crystal, and a process for performing the chamfering with the chamfering amount mark provided on the 1st substrate being made a reference.

Further, the invention provides a method of manufacturing a liquid crystal display device, comprising a process for forming conductive wirings on a 1st substrate, and forming a chamfering amount mark which is constituted by end portions of the conductive wirings and in which a wiring width changed portion is provided in a reference position in which a wiring width of the end portion of the conductive wiring has been changed at a predetermined interval and which consists of at least any of a center, an upper limit and a lower limit of chamfering on the 1st substrate, a process for bonding the 1st substrate after an orientation treatment and a 2nd substrate and injecting a liquid crystal, and a process for performing the chamfering with the chamfering amount mark provided on the 1st substrate being made a reference.

Additionally, the invention provides a method of manufacturing a liquid crystal display device, comprising, in such a constitution as mentioned above, a process for, when forming the conductive wirings on the 1st substrate, simultaneously forming a short wiring electrically connecting to the conductive wirings in the vicinity of an end portion of the 1st substrate, and a process for, when performing the chamfering with the chamfering amount mark being made a reference, simultaneously excising the short wiring.

DETAILED DESCRIPTION OF THE PREFERRED EMBODIMENTS

Embodiment 1

Figure 1A:
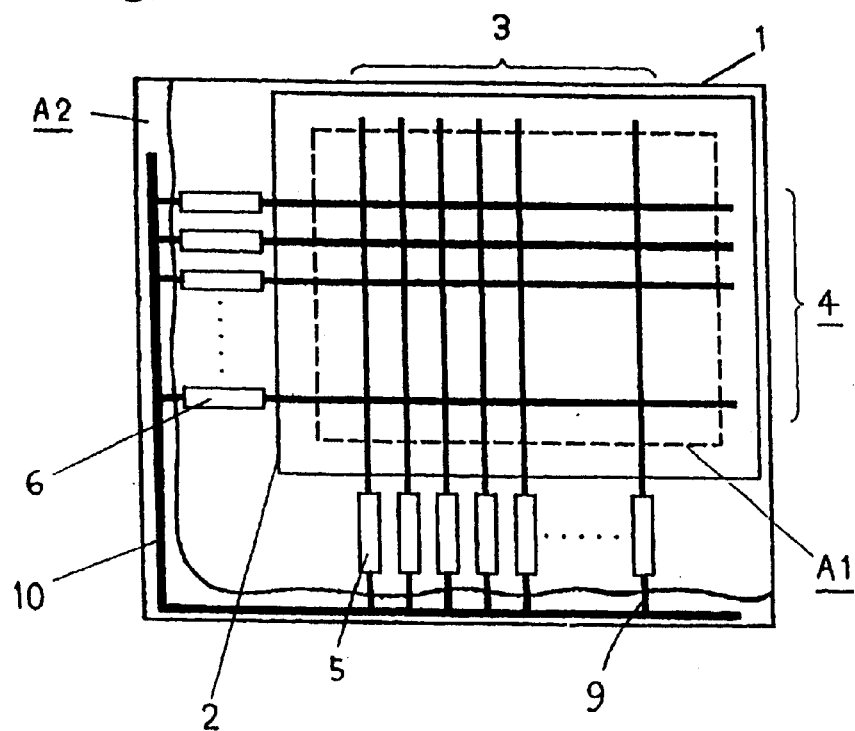
FIG. 1A and FIG. 1B are views showing a liquid crystal display device according to an Embodiment 1 of the invention.

Next, it is explained about a liquid crystal display device according to an Embodiment 1 of the invention. FIG. 1A is a plan view of a TFT liquid crystal display device according to the invention, which has a short wiring for electrically short-circuiting signal wirings or scan wirings, and which is manufactured by a method of excising the short wiring by chamfering a substrate end portion before a display inspection process. Further, FIG. 1B is a perspective view of a main portion centering around a chamfering area A2 of the liquid crystal display device according to the invention.

In the drawings, the reference numeral 1 denotes a 1st substrate, 2 a 2nd substrate disposed facing a region becoming a display area A1 within the 1st substrate 1, 3 signal wirings, 4 scan wirings intersecting the signal wirings 3 in the display area A1, 5 signal wiring connecting terminal portions electrically connected to the signal wirings 3, disposed in a position, of an end position of the 1st substrate 1, where the signal wirings 3 are extended, and intended to be connected to an external driving substrate, and 6 scan wiring connecting terminal portions electrically connected to the scan wirings 4 and disposed in a position, of an end position of the 1st substrate 1, where the scan wirings 4 are extended.

Further, the reference numeral 7 denotes a chamfering amount mark used as marks for making it possible to easily confirm a chamfering state by visual observation when performing an excising work (chamfering work) of the chamfering area A2. In a step before the chamfering is performed, the chamfering amount mark 7 is provided such that it is electrically connected to a short wiring 10 for electrically connecting plural extension wirings 9 extended from a connecting terminal portion (general term for signal wiring connecting terminals 5 and scan wiring connecting terminals 6) to an end portion side of the 1st substrate 1. Incidentally, the signal wirings 3, the scan wirings 4 and the extension wirings 9 correspond to conductive wirings.

Figure 1B:
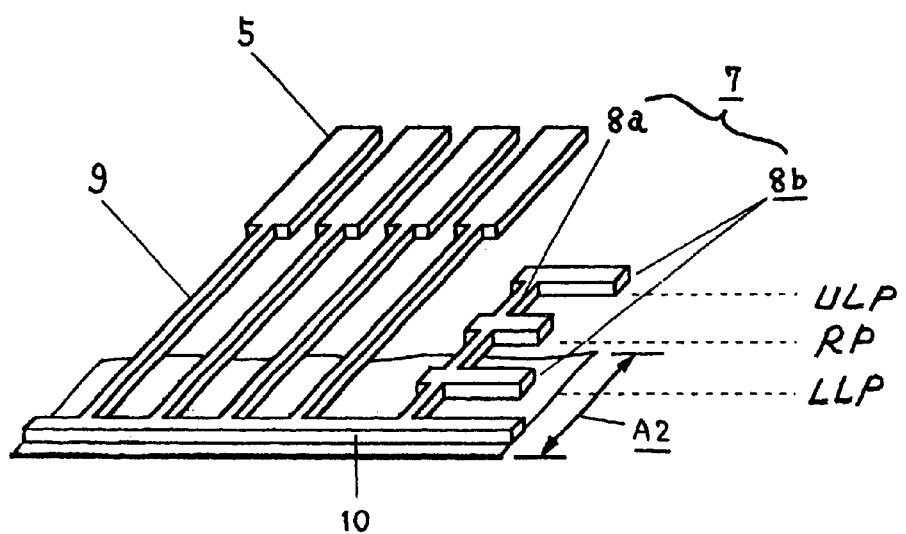

The chamfering amount mark 7 is, as its perspective view is shown in FIG. 1B, constituted by conductive mark patterns 8b and a connecting wiring 8a for electrically connecting the plural mark patterns 8b to the short wiring 10. The mark patterns 8b are disposed respectively at chamfering upper limit position (ULP) and lower limit position (LLP) spaced by a predetermined interval from a reference position (RP) becoming a center of chamfering target.

Incidentally, in case where it becomes a state that a section after the chamfering is formed in a substrate center side than the chamfering upper limit position, there arises a problem such as partial damage of a conductive pattern constituting the connecting terminal portion and the like. On the other hand, in case where it becomes a state that the section after the chamfering is formed in a substrate end face side than the chamfering lower limit position, there arises such a problem that an elimination of the short wiring 10 becomes incomplete, so that the wirings are short-circuited. Therefore, as to the fact that it is necessary to perform the chamfering ideally in the chamfering target center position or between the chamfering upper limit and lower limit positions, it is as explained in the description of the related art.

The liquid crystal display device formed in such a state is adapted to have a structure in which the conductive chamfering amount mark 7 composed of the connecting wiring 8a and the mark patterns 8b is maintained, in the step before the chamfering process, at the same electric potential as the short wiring 10 and the extension wirings 9, and a trouble resulting from a static electricity generated in the chamfering mark 7 itself can be prevented.

Incidentally, also by performing this form in any one of a scan wiring output portion and a signal wiring output portion, an efficiency of the chamfering control is enhanced, and it is needless to say that, by performing it in the both, it is possible to intend to further enhance the efficiency of the chamfering control. Further, by providing chamfering marks 7 in at least two places per one side, of the 1st substrate 1, becoming the chamfering area A2 to thereby provide more chamfering marks 7, it is possible to easily and more precisely grasp a chamfering accuracy by means of comparing the section after the chamfering with the chamfering amount marks by visual observation.

Further, as shown in the perspective view of FIG. 1B, since the chamfering amount mark 7 is formed by a conductive film of the same material simultaneously with a patterning of the signal wiring connecting terminal portions 5, the extension wirings 9 and the short wiring 10, it is unnecessary to add a process for manufacturing the chamfering amount mark 7, so that it is possible to prevent a process yield from decreasing.

Additionally, since the chamfering work can be performed while confirming the chamfering amount mark 7 by visual observation to thereby improve the chamfering accuracy, a dispersion in the chamfering amount becomes null, so that it is possible to prevent an elimination badness of the short wiring 10 and an excess chamfering. Further, by the fact that the chamfering dimension can be precisely grasped, it becomes possible to lighten the liquid crystal device and narrow its frame.

Incidentally, in the above explanation, it is described mainly about a case where the reference position when chamfering is the chamfering center, but the reference position may be made the chamfering upper limit position or the chamfering lower limit position. Further, in the above example, there is described a case where the upper limit and lower limit positions spaced respectively by the predetermined distance from the chamfering center which is the reference position are disposed, but the mark pattern 8b may be disposed, for example, only in the upper limit or lower limit position becoming the reference position, or the mark patterns 8b may be disposed in the upper limit and lower limit positions, so that it is possible to dispose the mark patterns 8b in various combinations.

Embodiment 2

Figure 2:
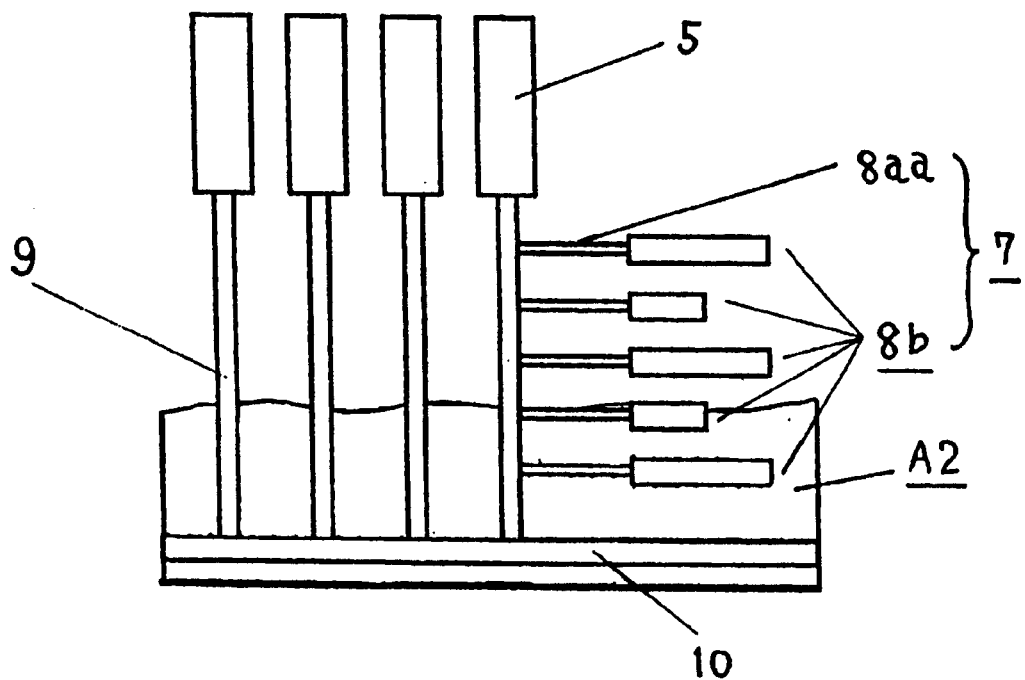
FIG. 2 is a view showing the liquid crystal display device according to an Embodiment 2 of the invention.

Next, FIG. 2 is a plan view of a main portion centering around the chamfering amount mark 7 of the liquid crystal display device according to an Embodiment 2 of the invention. In FIG. 2, the reference numeral 8aa denotes a connecting wiring directly branched from the extension wiring 9, and the connecting wiring 8aa is connected respectively to the mark patterns 8b. Incidentally, the same reference numeral as that already used for the explanation denotes the same or corresponding portion.

In the Embodiment 1, it has been mentioned about an example in which the connecting wiring 8a consisting of one wiring constituting the chamfering amount mark 7 is connected to the plural mark patterns 8b and the short wiring 10. However, even if there is adopted a structure in which plural connecting wirings 8aa are connected to the extension wiring 9 which is a conductive wiring, it is possible to obtain a similar effect.

Additionally, since the connecting wiring 8aa is disposed parallel to a chamfered line constituted by a chamfered substrate end portion, even after the chamfering process, the residual chamfering amount mark 7 is connected to another conductive wiring through the connecting wiring 8aa and maintained at the same electric potential, so that it is possible to prevent a static electricity trouble thereafter.

Further, as shown in FIG. 2, by disposing the mark patterns 8b constituting the chamfering amount mark 7 at the same interval also in an intermediate position other than the reference position becoming the chamfering center and the chamfering upper limit and lower limit positions by changing lengths of the patterns for instance, it is possible to cause the mark patterns 8b to function as a graduation, so that it becomes possible to precisely grasp the chamfering dimension.

Incidentally, since a usual chamfering amount is in the order of 0.2–0.5 mm, it is desirable to set a disposition cycle of the mark patterns 8b to in the order of 0.01–0.1 mm.

Additionally, besides disposing the mark patterns 8b becoming the graduation with any position of the chamfering center, upper limit and lower limit positions being made the reference position, for example, by means of attaching the graduation by disposing the mark patterns at the same interval from the end portion of the 1st substrate 1 in the step before the chamfering, or by means of attaching the graduation by disposing the mark patterns at the same interval from a disposition position of the short wiring 10, it is also possible to perform the chamfering with this graduation being made a reference.

Embodiment 3

Figure 3:
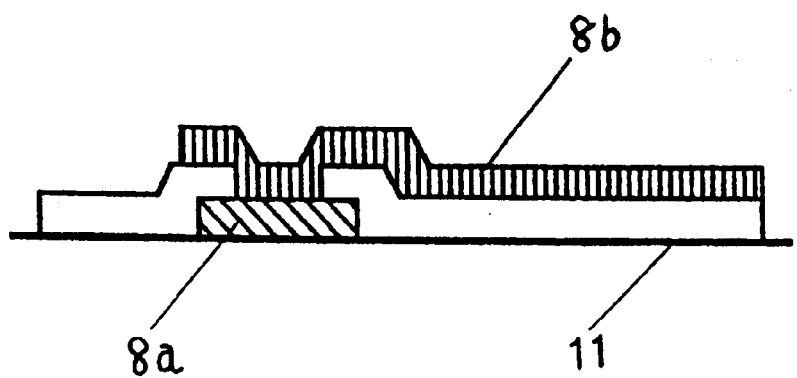
FIG. 3 is a view showing the liquid crystal display device according to an Embodiment 3 of the invention.

In the aforesaid example of FIGS. 1A and 1B, it has been mentioned about one in which the mark patterns 8b, the connecting wiring 8a, the extension wirings 9 and the short wiring 10 are formed by Cr, Al and the like, and an individual electric connection is realized by means of forming a film by the same thin film layer as another conductive pattern and integrally patterning in a developing process without adding a new mark forming process. In this Embodiment 3, as its main portion is shown in FIG. 3, there is shown a case where the connecting wiring 8a constituting the chamfering amount mark 7 and the mark patterns 8b are formed in different processes. Incidentally, in FIG. 3, the reference numeral 11 denotes a transparent insulating film.

After the connecting wiring 8a has been formed on the 1st substrate 1, the transparent insulating film 11 is formed, and a contact hole is opened in the transparent insulating film 11 positioned in a region where the mark patterns 8b formed in a later process and the connecting wiring 8a are superimposed. Additionally, by forming the mark patterns 8b on the contact hole, it is possible to ensure an electric connection in the contact hole. Incidentally, it is also possible to connect the connecting wiring 8a and the mark patterns 8b by forming them in the reverse order.

Embodiment 4

Figure 4:
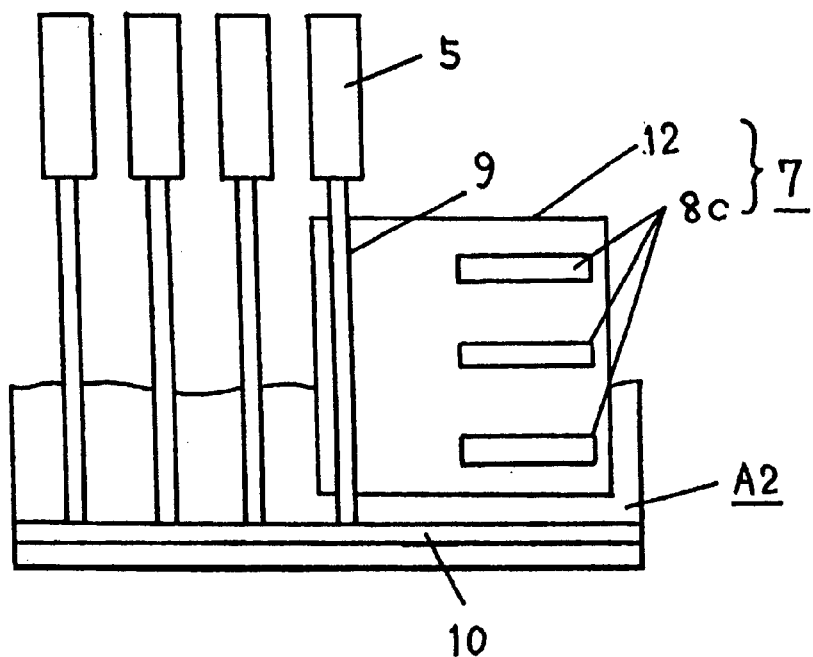
FIG. 4 is a view showing the liquid crystal display device according to an Embodiment 4 of the invention.

Next, FIG. 4 is a plan view of a main portion centering around the chamfering amount mark 7 of the liquid crystal display device according to an Embodiment 4 of the invention, and it is explained about it.

In FIG. 4, the reference numeral 8c denotes mark patterns formed on the chamfering amount mark 7 consisting of one continuous conductive pattern electrically connected to the extension wiring 9 and existing in a superposed position. The mark patterns 8c are disposed/formed respectively in the reference position becoming the chamfering center and positions corresponding to the chamfering upper limit and lower limit positions disposed while being spaced by the predetermined interval from reference position. The chamfering amount mark 7 covers the mark patterns 8c and a region where the plural mark patterns 8c are formed, and is constituted by one continuous conductive transparent film 12 extended to the extension wiring 9.

Incidentally, in FIG. 4, there is shown a case where the mark patterns 8c are provided in three points of the reference position becoming the chamfering center and the upper limit and lower limit positions, but another mark patterns may be formed at intermediate points between the three points as the graduation similarly to the case shown in the Embodiment 2. Further, the mark patterns 8c shown in FIG. 4 can be formed by the same manufacturing process as the extension wiring 9 which is another conductive wiring and, thereafter, the transparent conductive film 12 is formed through a transparent insulating film, and an electric connection can be intended by taking a contact in a region superposed with the extension wiring 9 as shown in the Embodiment 3. Further, it is also possible to preliminarily form the transparent conductive film 12 and, thereafter, form the extension wiring 9 and the mark patterns 8c, and electrically connect the both through an inside of contact hole provided in an insulation film interposed between layers.

Incidentally, in case where there is adopted a structure in which the transparent conductive film 12 is connected to the extension wiring 9, since the transparent conductive film 12 left after the chamfering and the extension wiring 9 are maintained at the same electric potential thereafter as well, it is possible to prevent the chamfering amount mark 7 from being electrified with static electricity.

Further, the transparent conductive film 12 may be connected to the short wiring 10 other than being connected to the extension wiring 9, and it is also possible to form the mark patterns 8c as a punched pattern in which a part of the transparent conductive film 12 lacks, other than constituting them by a conductive pattern different from the conductive wiring.

As shown in FIG. 4, in case of forming the chamfering amount mark 7 as one continuous relatively large conductive pattern, the chamfering amount mark 7 connected to the extension wiring 9 is partially left also after the chamfering process. However, usually, since end wirings positioned in a row of continuously disposed conductive wirings (corresponding to the signal wirings 3, the scan wirings 4 and the extension wirings 9 electrically connected to the formers) are preparatorily disposed wirings and, further, wirings in which the electric potential scarcely changes, a signal control is not adversely affected even if the chamfering amount mark 7 is left on the conductive wirings while being connected thereto.

Embodiment 5

Figure 5:
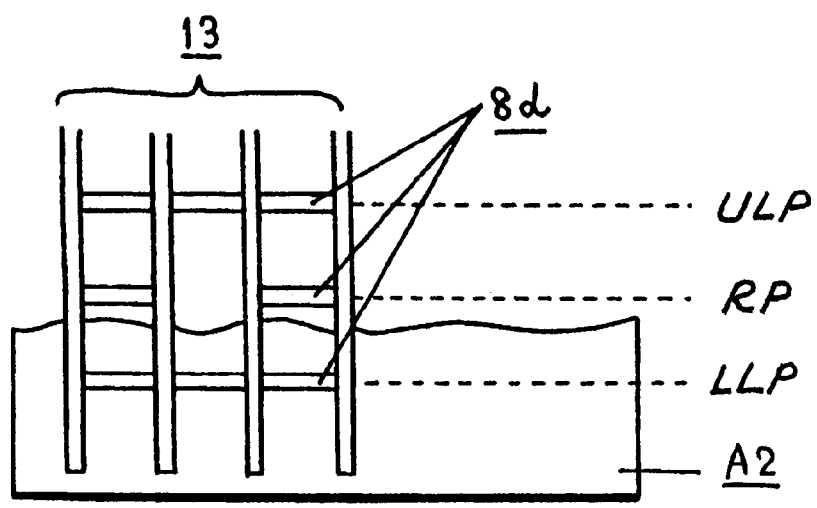
FIG. 5 is a view showing the liquid crystal display device according to an Embodiment 5 of the invention.

Next, it is explained about an Embodiment 5 of the invention. In FIG. 5, the reference numeral 8d denotes mark patterns, disposed in end portions of plural conductive wirings 13, for determining the chamfering amount, and the chamfering amount mark is formed under a state that the mark patterns 8*d* are disposed in a ladder-like form between the adjoining plural conductive wirings 13. Incidentally, the conductive wirings 13 are wirings electrically connected to the signal wirings 3 or the scan wirings 4 and, in FIG. 5, the wirings disposed in the vicinity of the chamfering area A2 are shown. Further, since the plural conductive wirings 13 become a state that they are mutually connected also after the chamfering process, it is necessary that the conductive wirings 13 connected by the mark patterns 8*d* are made wirings generating no problem in signal control by a connection, such as wirings to which the same electric potential is applied or preparatorily disposed wirings.

Incidentally, it is needless to say that the adverse effect by the static electricity can be more surely suppressed by forming the short wiring 10 similarly to the Embodiments 1–4 mentioned above.

Further, the mark patterns 8*d* shown in FIG. 5 are adapted so as to be respectively disposed in the reference position (RP) becoming the chamfering center and the upper limit position (ULP) and lower limit position (LLP) and, additionally, it becomes possible to differentiate the reference position from the upper limit and lower limit positions by, for example, increasing or decreasing a number of the mark patterns 8*d* disposed along a chamfering line of the reference position becoming the chamfering center than a number of the mark patterns 8*d* disposed in the upper limit and lower limit positions.

In this manner, in case of forming the chamfering amount mark by utilizing the end portions of the conductive wirings 13, it is unnecessary to dispose the mark by selecting a position where the conductive wirings are not formed, so that the mark can be formed in any place so long as it exists between the wirings to which the same electric potential is applied or between dummy wirings, and thus it becomes possible to precisely grasp the chamfering dimension at an optional position.

Embodiment 6

Figure 6:
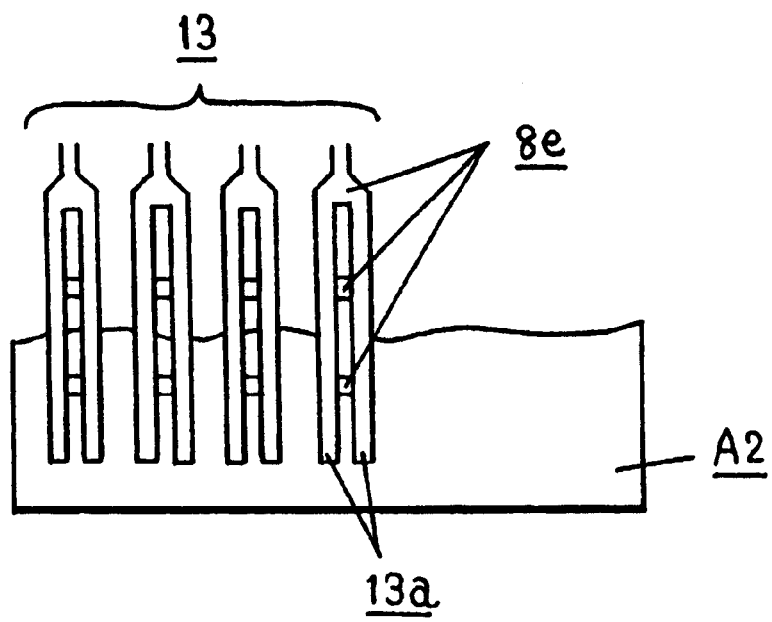
FIG. 6 is a view showing the liquid crystal display device according to an Embodiment 6 of the invention.

Next, it is explained about an Embodiment 6 according to the invention by using FIG. 6. In FIG. 6, the reference numeral Be denotes chamfering mark patterns provided between branch wirings 13*a* formed by branching an end portion of the conductive wiring 13 into a plural number (two in case of FIG. 6), and the chamfering amount mark is constituted by a region where the branch wirings 13*a* are disposed. Incidentally, the mark patterns 8*e* disposed between the wirings of the branch wirings 13*a* and partially connecting between the wirings can be patterned at the same time as the conductive wirings 13 are formed.

As shown in FIG. 6, in case where the mark patterns 8e are provided in two points, it is possible to set the mark pattern 8*e* at a side adjoining a branch portion of the conductive wiring 13 to the chamfering center position, the branch portion of the conductive wiring 13 to the chamfering upper limit position and the mark pattern 8*e* disposed in a position adjoining the end portion of the conductive wiring 13 to the chamfering lower limit position and, besides, it is possible to dispose the mark and the graduation in various states.

Further, in FIG. 6, there is shown an example in which lengths of the branch wirings 13*a* branched from one wiring are the same, but it is also possible to adopt, for example, a method in which the conductive wiring is branched in different lengths and a branch wiring end is utilized as one of marks.

In this manner, if there is adopted a form in which one wiring is branched and the mark patterns 8*e* are formed, in a ladder-like form, between the branch wirings 13*a*, it is unnecessary to dispose the chamfering amount mark by selecting the place between the wirings to which the same electric potential is applied or between the dummy wirings as described in the Embodiment 5, so that it becomes possible to form the chamfering amount mark in any place so long as it exists in the end portion of the conductive wiring 13.

Embodiment 7

Figure 7:
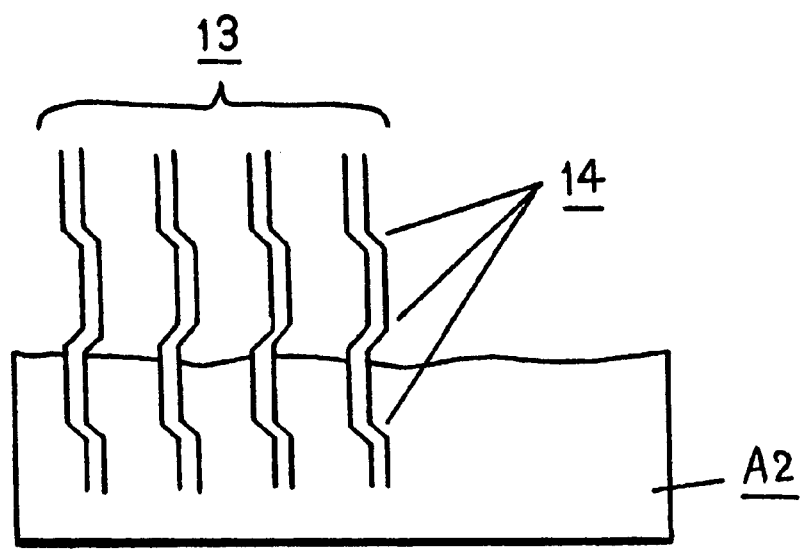
FIG. 7 is a view showing the liquid crystal display device according to an Embodiment 7 of the invention.

Next, it is explained about an Embodiment 7 of the invention by using FIG. 7. In FIG. 7, the reference numeral 14 denotes bent portions of the conductive wiring 13 positioned adjacently to the chamfering area A2. The conductive wiring 13 is in a bent and twisted state in the bent portion 14, and the reference position becoming the chamfering center and the upper limit and lower limit positions of one conductive wiring 13 are respectively disposed/formed in the bent portions 14.

By constituting the chamfering amount mark or the graduation for the chamfering by such bent portions 14, it is unnecessary to dispose the mark by selecting a position where the conductive wirings 13 are not formed and thus a place for forming the mark is not limited, so that it becomes possible to precisely grasp the chamfering dimension at an optional place.

Embodiment 8

Figure 8:
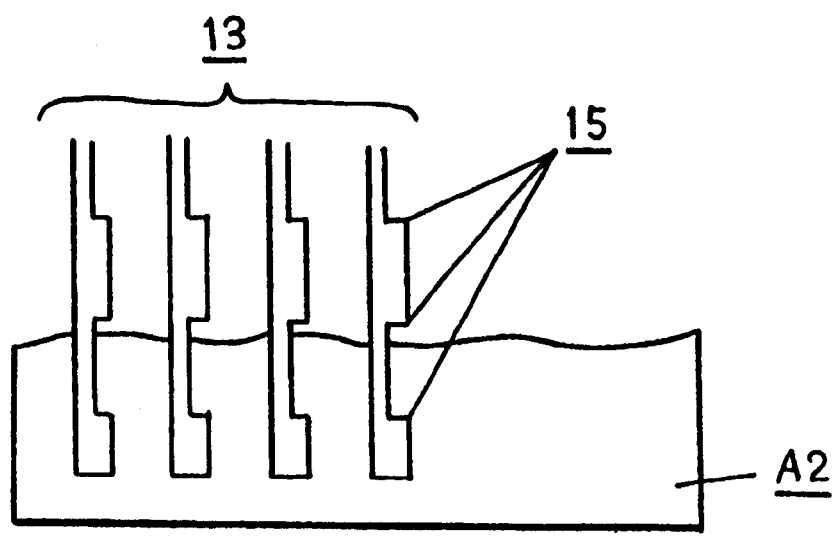
FIG. 8 is a view showing the liquid crystal display device according to an Embodiment 8 of the invention.
Figure 9A:
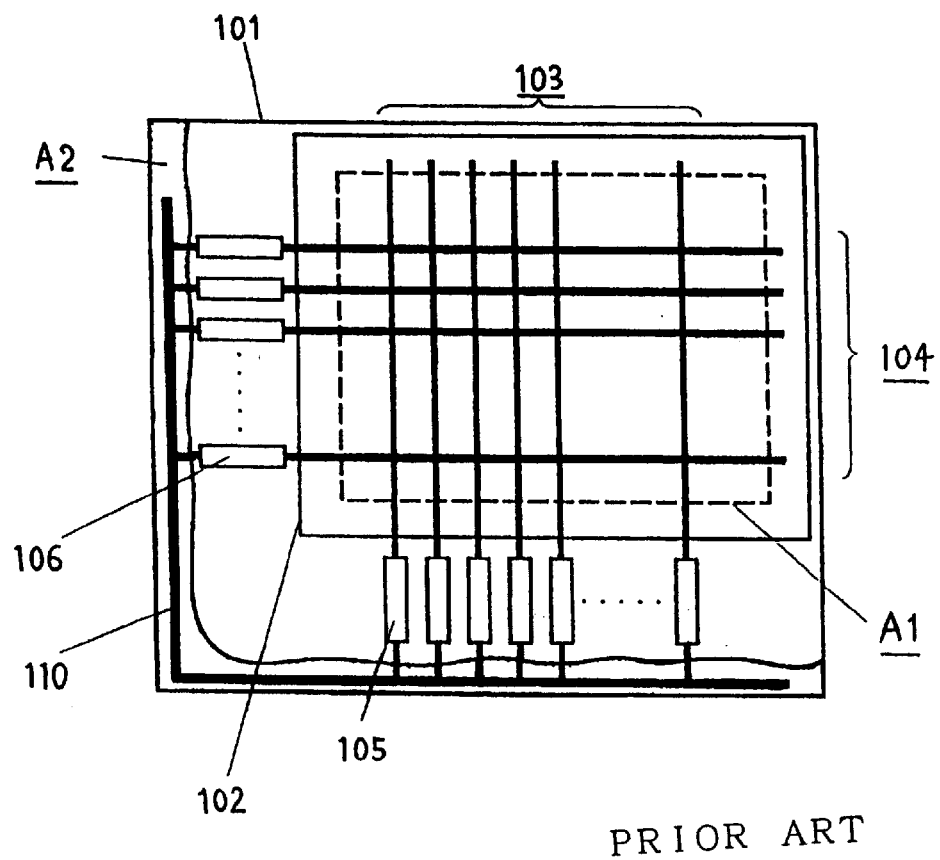
FIG. 9A and FIG. 9B are views showing a liquid crystal display device of prior art.
Figure 9B:
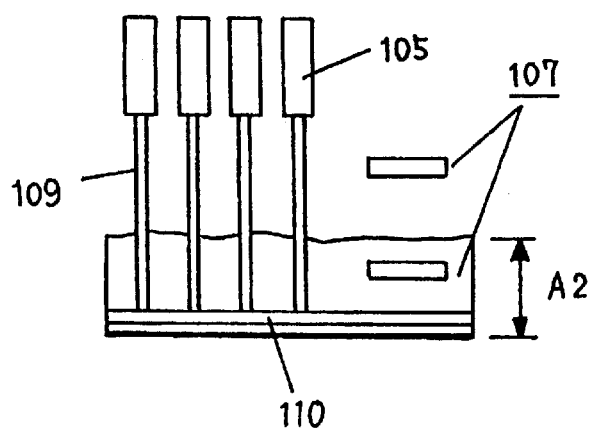

Next, it is explained about an Embodiment 8 of the invention by using FIG. 8. In FIG. 8, the reference numeral 15 denotes wiring width changed portions of the conductive wiring 13 positioned adjacently to the chamfering area A2, and the chamfering amount mark is made by changing a width of the wiring in the wiring width changed portion 15.

Incidentally, it is needless to say that it may be variously adapted such that the wiring width is made two kinds and the width is alternately changed in the wiring width changed portion 15 as shown in FIG. 8 or, for example, the wiring width is made three kinds and the wiring is made fine as approaching the end portion of the conductive wiring 13.

According to the invention, in a process of manufacturing the liquid crystal display device, since the chamfering work can be performed while visually observing the chamfering amount mark formed on the 1st substrate, it is possible to improve the chamfering accuracy and, by decreasing the chamfering amount, there is obtained the liquid crystal display device reduced in its cost, lightened in its weight and narrowed in its frame.

Further, since the plural mark patterns constituting the chamfering amount mark are made an electrically connected state, it becomes possible to prevent the electrification by making the chamfering amount mark into a state that it is connected to another conductive wiring in a step before the chamfering process.

Further, according to the invention, by constituting the chamfering amount mark such that it is electrically connected to the conductive wiring also after the chamfering work, it becomes possible to discharge the static electricity electrified in the chamfering amount mark even after the chamfering work, so that it is possible to prevent a decrease, in the process yield, owing to the display badness generated resulting from the static electricity.

Additionally, since the chamfering amount mark and the conductive wiring can be formed as one continuous pattern, it is unnecessary to add a manufacturing process for forming the chamfering amount mark.

Further, according to the invention, since it is possible to form the chamfering amount mark as a constitution including the mark patterns disposed, in a ladder-like form, between the wirings in the end portion of the conductive wiring and form the chamfering amount mark as a state that the static electricity electrified therein can be discharged, and since it becomes possible to improve the chamfering accuracy and additionally the mark can be formed in the end portion of the conductive wiring, it is unnecessary to ensure an area for forming the mark separately on the 1st substrate.

Additionally, since the chamfering amount mark can be formed by making it into a constitution including the mark patterns disposed, in a ladder-like form, between the branch wirings branched in the end portion of the conductive wiring, by making it into a structure in which the bent portions are provided in places becoming the marks in the end portion of the conductive wiring, and additionally by making it into a structure in which the wiring width changed portions are provided in places becoming the marks in the end portion of the conductive wiring, it is unnecessary to ensure the area for forming the mark separately on the 1st substrate.

What is claimed is:

1. A liquid crystal display device in which a liquid crystal is interposed between a first substrate and a second substrate, characterized in that a conductive chamfering amount mark provided on the first substrate and used as a mark when chamfering the first substrate is constituted by a mark pattern disposed in a reference position consisting of at least any of a center, an upper limit and a lower limit of chamfering on the first substrate and a connecting wiring connected to the mark pattern, and the chamfering amount mark is left contacting with a chamfered end portion of the first substrate.

2. A liquid crystal display device in which a liquid crystal is interposed between a first substrate and a second substrate, characterized in that a conductive chamfering amount mark provided on the first substrate and used as a mark when chamfering the first substrate is constituted by a mark pattern disposed in a reference position consisting of at least any of a center, an upper limit and a lower limit of chamfering on the first substrate and a connecting wiring for connecting the mark pattern to a conductive wiring formed on the first substrate.

3. A liquid crystal display device set forth in claim 2, characterized in that the conductive wiring and the chamfering amount mark are formed in one continuous pattern.

4. A liquid crystal display device set forth in claim 1 or 2, characterized in that the mark pattern and the connecting wiring are disposed through a transparent insulating film and electrically connected in a contact hole opened in the transparent insulating film.

5. A liquid crystal display device in which a liquid crystal is interposed between a first substrate and a second substrate, characterized in that a chamfering amount mark provided on the first substrate and used as a mark when chamfering the first substrate is constituted by a conductive pattern having a mark pattern disposed in a reference position consisting of at least any of a center, an upper limit and a lower limit of chamfering on the first substrate, and a conductive wiring formed on the first substrate and the conductive pattern are electrically connected at a mutually superposed position.

6. A liquid crystal display device set forth in claim 5, characterized in that the mark pattern is constituted by a different conductive pattern or a punched pattern.

7. A liquid crystal display device in which a liquid crystal is interposed between a first substrate and a second substrate, characterized in that a chamfering amount mark used as a mark when chamfering the first substrate is constituted by end portions of conductive wirings formed on the first substrate, and a conductive mark pattern is disposed, in a ladder-like form, between the plural adjoining conductive wirings, wherein the conductive mark pattern is disposed in a reference position consisting of at least any of a center, an upper limit and a lower limit of chamfering.

8. A liquid crystal display device in which a liquid crystal is interposed between a first substrate and a second substrate, characterized in that a chamfering amount mark provided on the first substrate and used as a mark when chamfering the first substrate is constituted by an end portion of a conductive wiring formed on the first substrate, and a mark pattern connected, in a ladder-like form, between branch wirings of the conductive wiring whose tip has been branched is disposed in a reference position consisting of at least any of a center, an upper limit and a lower limit of chamfering.

9. A liquid crystal display device in which a liquid crystal is interposed between a first substrate and a second substrate, characterized in that a chamfering amount mark provided on the first substrate used as a mark when chamfering the first substrate is constituted by changing, at a predetermined interval, a wiring width of an end portion of a conductive wiring formed on the first substrate, and a mark pattern consisting of a wiring width changed portion in which a width of the conductive wiring has been changed is disposed in a reference position consisting of at least any of a center, an upper limit and a lower limit of chamfering.

10. A method of manufacturing a liquid crystal display device, characterized by comprising a process for forming conductive wirings on a first substrate, forming a short wiring for mutually electrically connecting the plural conductive wirings in the vicinity of an end portion of the first substrate, and further forming a chamfering amount mark constituted by mark patterns electrically connected to the short wiring or the conductive wirings and disposed in a reference position consisting of at least any of a center, an upper limit and a lower limit of chamfering on the first substrate, and by a connecting wiring for mutually electrically connecting the plural mark patterns, a process for bonding the first substrate after an orientation treatment and a second substrate and injecting a liquid crystal, and a process for performing the chamfering with the chamfering amount mark provided on the first substrate being made a reference, thereby excising the short wiring.

11. A method of manufacturing a liquid crystal display device, characterized by comprising a process for forming conductive wirings on a first substrate, forming a short wiring for mutually electrically connecting the plural conductive wirings in the vicinity of an end portion of the first substrate, and further forming a chamfering amount mark constituted by mark patterns electrically connected to the conductive wirings and disposed in a reference position consisting of at least any of a center, an upper limit and a lower limit of chamfering on the first substrate, and by a connecting wiring for mutually electrically connecting the mark patterns to the conductive wirings, a process for bonding the first substrate after an orientation treatment and a second substrate and injecting a liquid crystal, and a process for performing the chamfering with the chamfering amount mark provided on the first substrate being made a reference, thereby excising the short wiring.

12. A method of manufacturing a liquid crystal display device, characterized by comprising a process for forming conductive wirings on a first substrate and forming a short wiring for mutually electrically connecting the plural conductive wirings in the vicinity of an end portion of the first substrate, a process for forming a chamfering amount mark constituted by mark patterns electrically connected to the short wiring on the first substrate and disposed in a reference position consisting of at least any of a center, an upper limit and a lower limit of chamfering on the first substrate, and by a connecting wiring superposed with the mark patterns through a transparent insulating film, performing an electric connection to the mark patterns in a contact hole opened in the transparent insulating film, and mutually electrically connecting the plural mark patterns or electrically connecting the mark patterns to the conductive wirings, a process for bonding the first substrate after an orientation treatment and a second substrate and injecting a liquid crystal, and a process for performing the chamfering with the chamfering amount mark provided on the first substrate being made a reference, thereby excising the short wiring.

13. A method of manufacturing a liquid crystal display device, characterized by comprising a process for forming conductive wirings on a first substrate and forming a short wiring for mutually electrically connecting the plural conductive wirings in the vicinity of an end portion of the first substrate, a process for forming a transparent insulating film on the first substrate including surfaces of the conductive wirings, a process for forming a contact hole in the transparent insulating film positioned on the conductive wirings, a process for forming a chamfering amount mark constituted by conductive patterns including, on the transparent insulating film, mark patterns disposed in a reference position consisting of at least any of a center, an upper limit and a lower limit of chamfering on the first substrate, and performing an electric connection between the conductive wirings and the chamfering amount mark in the contact hole, a process for bonding the first substrate after an orientation treatment and a second substrate and injecting a liquid crystal, and a process for performing the chamfering with the chamfering amount mark provided on the first substrate being made a reference, thereby excising the short wiring.

14. A method of manufacturing a liquid crystal display device, characterized by comprising a process for forming a chamfering amount mark constituted by conductive patterns including, in the vicinity of an end portion to be chamfered of a first substrate, mark patterns disposed in a reference position consisting of at least any of a center, an upper limit and a lower limit of chamfering on the first substrate, a process for forming a transparent insulating film on the first substrate including a surface of the chamfering amount mark, a process for opening a contact hole in the transparent insulating film positioned on the chamfering amount mark, a process for forming conductive wirings on the transparent insulating film and, at the same time, forming a short wiring for mutually electrically connecting the plural conductive wirings in the vicinity of the end portion of the first substrate, and performing an electric connection between the conductive wirings and the chamfering amount mark in the contact hole, a process for bonding the first substrate after an orientation treatment and a second substrate and injecting a liquid crystal, and a process for performing the chamfering with the chamfering amount mark provided on the first substrate being made a reference, thereby excising the short wiring.

15. A method of manufacturing a liquid crystal display device set forth in claim 13 or 14, characterized in that the mark pattern is formed by a different conductive pattern or a punched pattern.

16. A method of manufacturing a liquid crystal display device, characterized by comprising:
   a process for forming conductive wirings on a first substrate, and forming a chamfering amount mark which is constituted by end portions of the conductive wirings and in which a conductive mark pattern is disposed, in a ladder-like form, between the plural adjoining conductive wirings, wherein the conductive mark pattern is disposed in a reference position consisting of at least any of a center, an upper limit and a lower limit of chamfering;
   a process for bonding the first substrate after an orientation treatment and a second substrate and injecting a liquid crystal; and
   a process for performing the chamfering with the chamfering amount mark provided on the first substrate being made a reference.

17. A method of manufacturing a liquid crystal display device, characterized by comprising a process for forming conductive wirings on a first substrate, and forming a chamfering amount mark which is constituted by end portions of the conductive wirings and in which a mark pattern connected, in a ladder-like form, between branch wirings of the conductive wiring whose tip has been branched is disposed in a reference position consisting of at least any of a center, an upper limit and a lower limit of chamfering, a process for bonding the first substrate after an orientation treatment and a second substrate and injecting a liquid crystal, and a process for performing the chamfering with the chamfering amount mark provided on the first substrate being made a reference.

18. A method of manufacturing a liquid crystal display device, characterized by comprising a process for forming conductive wirings on a first substrate, and forming a chamfering amount mark which is constituted by end portions of the conductive wirings and in which a bent portion is provided in a reference position constituted by bending an end portion of the conductive wiring and consisting of at least any of a center, an upper limit and a lower limit of chamfering, a process for bonding the first substrate after an orientation treatment and a second substrate and injecting a liquid crystal, and a process for performing the chamfering with the chamfering amount mark provided on the first substrate being made a reference.

19. A method of manufacturing a liquid crystal display device, characterized by comprising a process for forming conductive wirings on a first substrate, and forming a chamfering amount mark which is constituted by end portions of the conductive wirings and in which a wiring width changed portion is provided in a reference position in which a wiring width of the end portion of the conductive wiring has been changed at a predetermined interval and which consists of at least any of a center, an upper limit and a lower limit of chamfering on the first substrate, a process for bonding the first substrate after an orientation treatment and a second substrate and injecting a liquid crystal, and a process for performing the chamfering with the chamfering amount mark provided on the first substrate being made a reference.

20. A method of manufacturing a liquid crystal display device set forth in anyone of claims 16–19, characterized by comprising a process for, when forming the conductive wirings on the first substrate, simultaneously forming a short wiring electrically connecting to the conductive wirings in the vicinity of an end portion of the first substrate, and a process for, when performing the chamfering with the chamfering amount mark being made a reference, simultaneously excising the short wiring.

21. A liquid crystal display device comprising:
   a first substrate having a display area and a peripheral area positioned on an outer portion of the display area;

a second substrate opposing the display area of the first substrate and interposing a liquid crystal layer therebetween;

a plurality of signal wirings disposed on the display area and extending to the peripheral area of the first substrate;

a plurality of scanning wirings disposed on the display area and extending to the peripheral area of the first substrate;

a conductive chamfering amount mark disposed on the peripheral area of the first substrate, and a chamfering area formed on an outer end portion of the peripheral area of the first substrate, wherein the plurality of signal wirings and the plurality of scanning wirings have extension wirings extended to the inside edge of the chamfering area, the conductive chamfering amount mark including a maximum limit mark pattern and a connecting member connecting the maximum limit mark pattern to at least one extension wiring selected from the extension wirings, and the maximum limit mark pattern showing a maximum amount for the chamfering area and left on the peripheral area beside the chamfering area.

22. The liquid crystal display device claimed in claim 21, wherein the conductive chamfering amount mark and the one extension wiring are formed in one continuous pattern.

23. The liquid crystal display device claimed in claim 21, wherein the maximum limit mark pattern and the connecting member are disposed through a transparent insulating film and electrically connected in a contact hole opened in the transparent insulating film.

24. The liquid crystal display device claimed in claim 21, wherein the connecting member is composed of a transparent conductive material and overlapped and connected with the one extension wiring.

25. The liquid crystal display device claimed in claim 24, wherein the maximum limit mark pattern is overlapped and connected with the conductive member.

26. The liquid crystal display device claimed in claim 21, wherein the connecting member includes at least two conductive wirings disposed in parallel to each other and the maximum limit mark pattern is extended between the two conductive wirings.

27. The liquid crystal display device claimed in claim 21, wherein the connecting member includes at least one conductive wiring having a pair of branch portions and the maximum limit mark pattern is extended between the pair of branch portions.

28. The liquid crystal display device claimed in claim 21, wherein the connecting member includes at least one conductive wiring and the maximum limit mark pattern is integrally formed with the conductive wiring as a different width from portion of the conductive wiring.

29. A liquid crystal display device comprising:

a first substrate having a display area and a peripheral area positioned on an outer portion of the display area;

a second substrate opposing the display area of the first substrate and interposing a liquid crystal layer therebetween;

a plurality of signal wirings disposed on the display area and extending to the peripheral area of the first substrate;

a plurality of scanning wirings disposed on the display area and extending to the peripheral area of the first substrate;

a conductive chamfering amount mark disposed on the peripheral area of the first substrate; and a chamfering area formed on an outer end portion of the peripheral area of the first substrate, wherein the plurality of signal wirings and the plurality of scanning wirings have extension wirings extending to the inside edge of the chamfering area, the conductive chamfering amount mark includes a maximum limit mark pattern and a conductive wire extending from the maximum limit mark pattern to the inner edge of the chamfering area, the maximum limit mark pattern is for showing a maximum amount for the chamfering area and left on the peripheral area beside the chamfering area, and the conductive wire is left on the peripheral area beside the chamfering area in a state such that the outer end of the connective member is adjacent the inner edge of the chamfering area.

30. A method of manufacturing a liquid crystal display device, the method comprising:

preparing one substrate including a display area and a peripheral area positioned on an outer portion of the display area, a first forming step for forming a plurality of signal wirings on the display area extended to an outer edge portion of the peripheral area, a plurality of scanning wirings disposed on the display area and extending to the outer edge portion of the peripheral area, a short wiring disposed on the outer edge portion of the peripheral area connected to all of the signal wirings and the scanning wirings, a chamfering amount mark having a mark pattern including a maximum limit mark pattern and minimum limit mark pattern, and a connecting member connecting the mark pattern to at least one wiring selected from the signal wirings and the scanning wirings, and a second forming step for forming a chamfering area on the outer portion of the peripheral area to excise the short wiring, the outer portions of the signal wirings and the scanning wirings, and the minimum limit mark pattern using the mark pattern as a reference, after performing the orientation treatment to the one substrate, wherein in the second forming step, the chamfering area is formed to leave the maximum limit mark pattern beside the chamfering area.

31. The method of manufacturing the liquid crystal display device claimed in claim 30, wherein in the second forming step, the outer portion of the connecting member is removed with the minimum limit mark pattern.

32. The method of manufacturing the liquid crystal display device claimed in claim 30, wherein the connecting portion of the connecting chamfering area with the maximum limit mark.

33. The method of manufacturing the liquid crystal display device claimed in claim 30, wherein the mark pattern is formed to have a center mark disposed between the maximum limit mark pattern and the minimum limit mark pattern.

34. The method of manufacturing the liquid crystal display device claimed in claim 30, wherein the mark pattern and the connecting member are formed through a transparent insulating film and electrically connected in a contact hole opened in the transparent insulating film.

35. The method of manufacturing the liquid crystal display device claimed in claim 30, wherein the connecting member is composed of a transparent conductive material and the conductive member is overlapped and connected with the one wiring.

36. The method of manufacturing the liquid crystal display device claimed in claim 35, wherein the mark pattern is overlapped and connected with the connecting member.

37. The method of manufacturing the liquid crystal display device claimed in claim 30, wherein the connecting member is formed to include at least two conductive wirings in parallel to each other and the mark pattern is extended between the two conductive wirings.

38. The method of manufacturing the liquid crystal display device claimed in claim 30, wherein the connecting member is formed to include at least one conductive wiring having a pair of branch portions and the mark pattern is extended between the pair of branch portions.

39. The method of manufacturing the liquid crystal display device claimed in claim 30, wherein the connecting member is formed to include at least one conductive wiring having at least two bent portions, and the maximum limit mark and the minimum limit mark are formed by the two bent portions, respectively.

40. The method of manufacturing the liquid crystal display device claimed in claim 30, wherein the connecting member is formed to include at least one conductive wiring having at least two different width portions from other portion of the one conductive wiring, and the maximum limit mark and the minimum limit mark are formed by the two different width portions, respectively.

41. A liquid crystal display device set forth in claim 7, wherein said conductive mark pattern is connected between the plural adjoining conductive wirings.

42. A method of manufacturing a liquid crystal display device set forth in claim 17, wherein said conductive mark pattern is connected between the plural adjoining conductive wirings.

* * * * *